United States Patent
Key et al.

(10) Patent No.: US 6,824,148 B1
(45) Date of Patent: Nov. 30, 2004

(54) CONVERSION SLED FOR STROLLER WHEELS

(76) Inventors: Theodore Key, 3535 Rochambean Ave. #4F, New York, NY (US) 10467; Melinda Key, 145 Valentine La., New York, NY (US) 10705

( * ) Notice: Subject to any disclaimer, the term of this patent is extended or adjusted under 35 U.S.C. 154(b) by 65 days.

(21) Appl. No.: 10/190,766

(22) Filed: Jul. 8, 2002

Related U.S. Application Data

(63) Continuation-in-part of application No. 09/659,717, filed on Sep. 8, 2000, now abandoned.

(51) Int. Cl.[7] .............................................. B62B 13/18
(52) U.S. Cl. .............................. 280/9; 280/7.12; 280/13
(58) Field of Search ........................ 280/8, 9, 10, 7.1, 280/7.12, 7.14, 7.15, 11, 609, 13, 14, 28

(56) References Cited

U.S. PATENT DOCUMENTS

| | | | | |
|---|---|---|---|---|
| 1,209,398 A | * | 12/1916 | Converse | 280/14 |
| 1,291,229 A | * | 1/1919 | Stevnor, Jr. | 280/10 |
| 1,389,418 A | * | 8/1921 | Arner | 280/7.14 |
| 1,714,902 A | * | 5/1929 | Croswell | 280/9 |
| 2,063,627 A | * | 12/1936 | Ruf | 280/8 |
| 2,539,686 A | * | 1/1951 | Ballentine | 280/10 |
| 2,544,163 A | * | 3/1951 | Hyde | 280/11 |
| 2,759,738 A | * | 8/1956 | Reiter | 280/62 |
| 2,817,536 A | * | 12/1957 | Taggart | 280/11 |
| 2003/0025284 A1 | * | 2/2003 | Edwards et al. | 280/7.12 |

FOREIGN PATENT DOCUMENTS

CA 2356585 * 2/2003

* cited by examiner

*Primary Examiner*—Bryan Fischmann
(74) *Attorney, Agent, or Firm*—Goldstein Law Offices, P.C.

(57) ABSTRACT

A conversion sled for stroller wheels including a sled portion comprised of an arcuate ski rotatably coupled with the bifurcated bracket of the stroller frame in a spaced relationship with respect to the stroller wheel. A number of sled portions corresponds with a number of stroller wheels of the stroller.

3 Claims, 2 Drawing Sheets

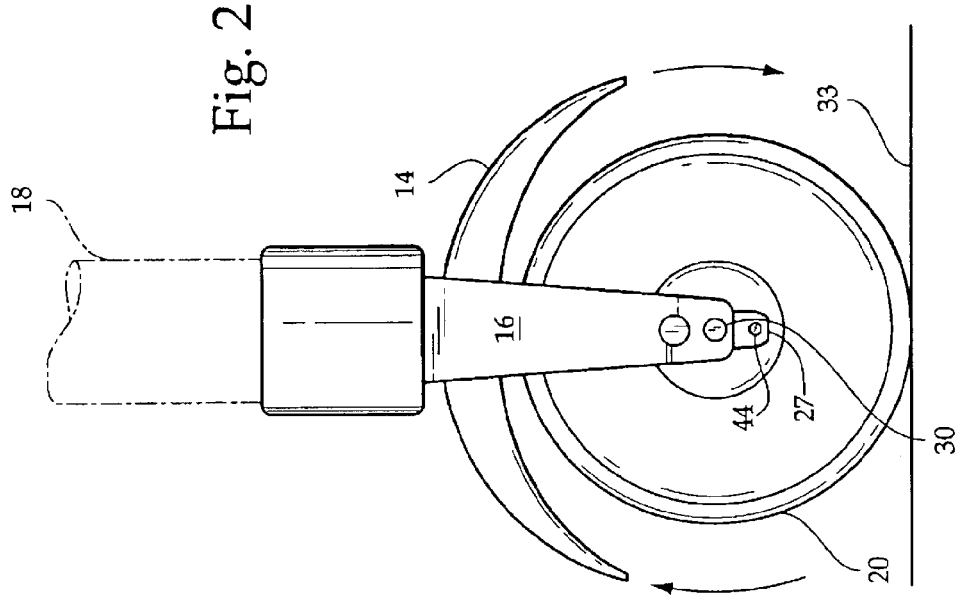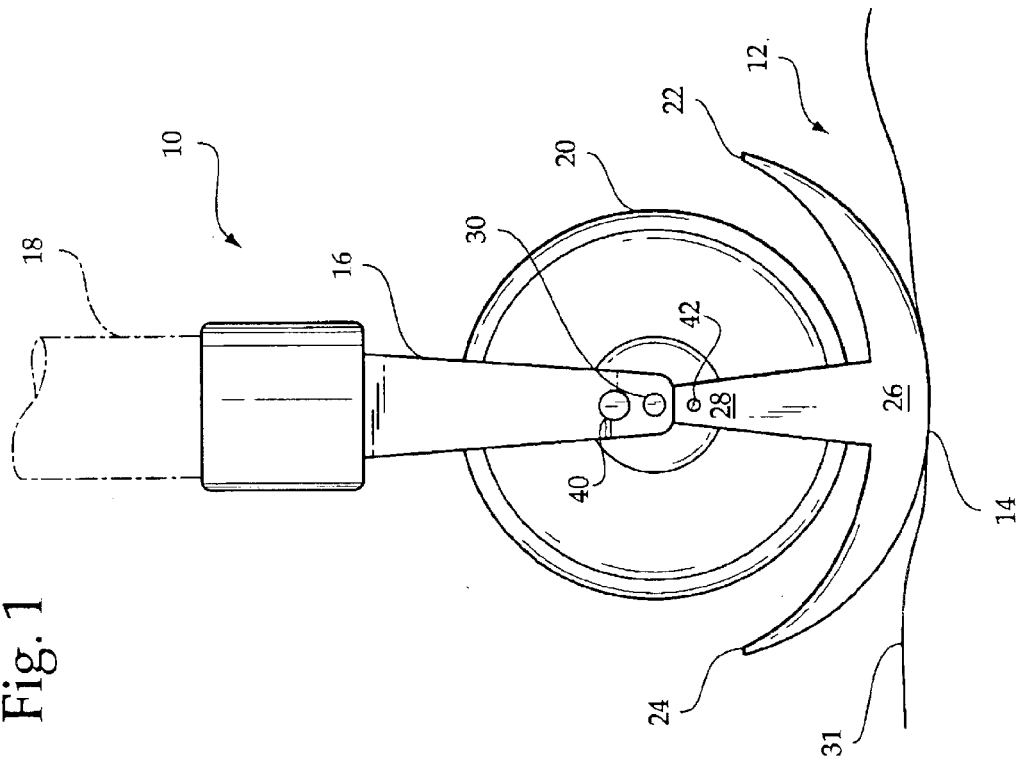

CONVERSION SLED FOR STROLLER WHEELS

CROSS REFERENCES AND RELATED SUBJECT MATTER

This application is a continuation-in-part of patent application Ser. No. 09/659,717, filed in the United States Patent Office on Sep. 8, 2000. This application has been abandoned.

BACKGROUND OF THE INVENTION

The present invention relates to a conversion sled for stroller wheels and more particularly pertains to allowing a stroller to be maneuvered in snowy conditions.

The use of combination land vehicles is known in the prior art. More specifically, combination land vehicles heretofore devised and utilized for the purpose of converting land vehicles into different configurations are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,407,217 to Lambert discloses a pair of detachable skis for a wheeled child's vehicle. U.S. Pat. No. 4,479,657 to Reynolds discloses a set of skis that are used to temporarily convert a child's stroller into a sled. U.S. Pat. No. 5,176,395 to Garforth-Bles discloses a child's carriage that is capable of being converted into a number of configurations, including a sled.

While these devices fulfill their respective, particular objective and requirements, the aforementioned patents do not describe a conversion sled for stroller wheels for allowing a stroller to be maneuvered in snowy conditions.

In this respect, the conversion sled for stroller wheels according to the present invention substantially departs from the conventional concepts and designs of the prior art, and in doing so provides an apparatus primarily developed for the purpose of allowing a stroller to be maneuvered in snowy conditions.

Therefore, it can be appreciated that there exists a continuing need for a new and improved conversion sled for stroller wheels which can be used for allowing a stroller to be maneuvered in snowy conditions. In this regard, the present invention substantially fulfills this need.

SUMMARY OF THE INVENTION

In the view of the foregoing disadvantages inherent in the known types of combination land vehicles now present in the prior art, the present invention provides an improved conversion sled for stroller wheels. As such, the general purpose of the present invention, which will be described subsequently in greater detail, is to provide a new and improved conversion sled for stroller wheels which has all the advantages of the prior art and none of the disadvantages.

To attain this, the present invention essentially comprises a sled portion comprised of an arcuate ski rotatably coupled with the bifurcated bracket of the stroller frame in a spaced relationship with respect to the stroller wheel. The arcuate ski has a wide central section and opposed tapered forward and rearward sections. The arcuate ski has opposed upwardly extending side walls. The side walls each have a side bracket extending upwardly therefrom. Each side bracket has a free upper end with an aperture therethrough. The apertures are coupled with the axle of the stroller wheel whereby the side brackets are positioned between the bifurcated bracket of the stroller frame. A number of sled portions corresponds with a number of stroller wheels of the stroller.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved conversion sled for stroller wheels which has all the advantages of the prior art combination land vehicles and none of the disadvantages.

It is another object of the present invention to provide a new and improved conversion sled for stroller wheels which may be easily and efficiently manufactured and marketed.

It is a further object of the present invention to provide a new and improved conversion sled for stroller wheels which is of durable and reliable construction.

An even further object of the present invention is to provide a new and improved conversion sled for stroller wheels which is susceptible of a low cost of manufacture with regard to both materials and labor, and which accordingly is then susceptible of low prices of sale to the consuming public, thereby making such a conversion sled for stroller wheels economically available to the buying public.

Even still another object of the present invention is to provide a new and improved conversion sled for stroller wheels for allowing a stroller to be maneuvered in snowy conditions.

Lastly, it is an object of the present invention to provide a new and improved conversion sled for stroller wheels including a sled portion comprised of an arcuate ski rotatably coupled with the bifurcated bracket of the stroller frame in a spaced relationship with respect to the stroller wheel. A number of sled portions corresponds with a number of stroller wheels of the stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the preferred embodiment of the conversion sled for stroller wheels constructed in accordance with the principles of the present invention.

FIG. 2 is a side view of the present invention illustrated with the sled portion in a raised orientation.

The same reference numerals refer to the same parts through the various figures.

DESCRIPTION OF THE PREFERRED EMBODIMENT

Figure 3:
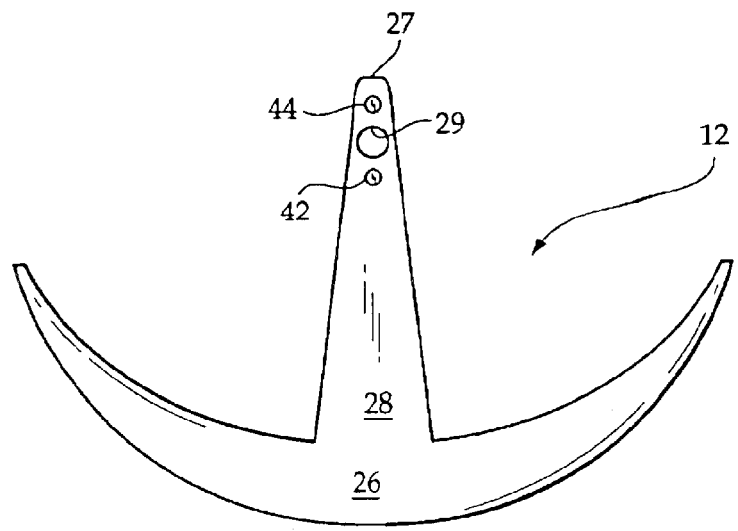
FIG. 3 is an isolated side view of the present invention.

With reference now to the drawings, and in particular, to FIGS. 1 through 4 thereof, the preferred embodiment of the new and improved conversion sled for stroller wheels embodying the principles and concepts of the present invention and generally designated by the reference number 10 will be described.

Specifically, it will be noted in the various figures that the device relates to a conversion sled for stroller wheels for allowing a stroller to be maneuvered in snowy conditions.

The present invention is essentially comprised of a sled portion 12. The sled portion 12 is comprised of an arcuate ski 14 rotatably coupled with the bifurcated bracket 16 of the stroller frame 18 in a spaced relationship with respect to the stroller wheel 20. The arcuate ski 14 has a wide central section and opposed tapered forward and rearward sections 22, 24. The arcuate ski 14 has opposed upwardly extending side walls 26. The side walls 26 each have a side bracket 28 extending upwardly therefrom. Each side bracket 28 has a free upper end 27 with an aperture 29 near the free upper end 27. The apertures 29 are coaxial so that they may be coupled with the axle 30 of the stroller wheel 20 whereby the side brackets 28 are positioned between the bifurcated bracket 16 of the stroller frame 18. A number of sled portions 12 is provided to correspond with a number of stroller wheels 20 of the stroller. This design allows for the conversion of an existing stroller into a convertible design which allows a user to change the stroller into a snow-friendly type of stroller. FIG. 1 illustrates the present invention is a sled mode where the sled portion 12 has been rotated to a down position to allow the stroller to be pushed through the snow 31. FIG. 2 illustrates the sled portion 12 in a raised position where the stroller can be operated in a standard mode on sidewalks 33, roads, and the like.

Figure 4:
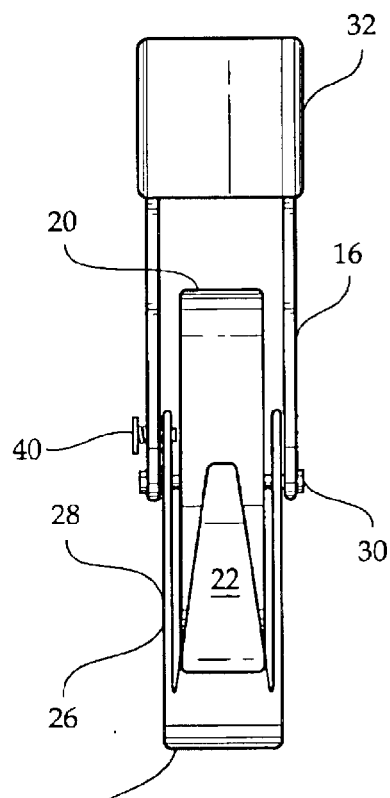
FIG. 4 is a front view of the present invention illustrated in use.

With regard to maintaining the sled portions 12 in the upward or downward position, a locking mechanism is provided. Such a mechanism can be configured in numerous ways, as would be appreciated by one of ordinary skill in the art. However, an example is illustrated in FIG. 4, wherein a spring biased pin 40 extends through one wall of the bifrucated bracket. As seen in FIG. 3, one of the side brackets 28 has an outer mating hole 42 and an inner mating hole 44. The outer mating hole 42 is located between the aperture 29 and the free upper end 27 of the side bracket 28. The inner mating hole 44 is located between the aperture 29 and the arcuate ski 14. However, the inner mating hole 44 and outer mating hole 42 are located an equal distance from the aperture 29 to ensure that the inner or outer mating holes 44 or 42 will align with the pin 40 as the ski 14 is rotated about the axle 30 which will extend through the apertures 29. The spring biased pin 40 is selectively engageable with the inner mating hole 44, to lock the ski 14 in the downward position for use upon ice and snow (note that the free upper end 27 of the side brackets 28 is oriented downward); and is selectively engageable with the outer mating hole 42 in the position illustrated in FIG. 4 to lock the ski 14 in the upward position where the ski 14 does not interfere with the normal useage of the wheels 20 upon pavement or other tractionable ground surfaces. Altering the position of the ski 14 simply involves pulling the pin outward slightly, increasing the tension of the spring until the pin 40 is freed from the hole 42 or 44. The ski can then be pivoted until the pin 40 is aligned with the other of the holes 42 or 44. Once so aligned, the pin 40 is released and the spring holds the pin 40 in that hole. As previously mentioned, however, the ski can be selectively locked in the upward and downward position in numerous ways.

Alternately, the present invention could marketed as a single unit that would not require any conversion. In this design, the present invention would include a plurality of collars 32 that are secured to the lower ends of the stroller frame 18. The collars 32 have the bifurcated bracket 16 depending therefrom. Note FIG. 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A conversion sled for at least one stroller wheel for allowing a stroller to be maneuvered in snowy conditions, wherein the at least one stroller wheel is disposed at at least one lower end of a stroller frame, the at least one lower end having a bifurcated bracket with the stroller wheel disposed within the bifurcated bracket, an axle extends through the bracket and the stroller wheel to facilitate securement of the wheel to the bracket, the conversion sled for stroller wheels comprising:

a sled portion comprised of an arcuate ski rotatably coupled with the bifurcated bracket of the stroller frame in a spaced relationship with respect to the stroller wheel, the arcuate ski having a wide central section and opposed tapered forward and rearward sections, the arcuate ski having opposed upwardly extending side walls, the side walls each having a side bracket extending upwardly therefrom, each side bracket having a free upper end with an aperture therethrough, the apertures being coupled with the axle of the stroller wheel whereby the side brackets are positioned between the bifurcated bracket of the stroller frame, wherein the sled portion corresponds with the stroller wheel of the stroller.

2. A conversion sled for at least one stroller wheel for allowing a stroller to be maneuvered in snowy conditions, wherein the at least one stroller wheel is disposed at at least one lower end of a stroller frame, the at least one lower end having a bifurcated bracket with the stroller wheel disposed within the bifurcated bracket, an axle extends through the bracket and the stroller wheel to facilitate securement of the wheel to the bracket, the conversion sled for stroller wheels comprising:

a sled portion comprised of an arcuate ski rotatably coupled with the bifurcated bracket of the stroller frame in a spaced relationship with respect to the stroller wheel, wherein the sled portion corresponds with the stroller wheel of the stroller, wherein the arcuate ski has opposed upwardly extending side walls, the side walls each having a side bracket extending upwardly therefrom, each side bracket having a free upper end with an aperture therethrough, the apertures being coupled with the axle of the stroller wheel whereby the side brackets are positioned between the bifurcated bracket of the stroller frame.

3. A conversion sled for a stroller for allowing a stroller to be maneuvered in snowy conditions, wherein the stroller includes a stroller frame having at least one lower end, the conversion sled for stroller wheels comprising:

a collar securable to one of the lower ends of the stroller frame, the collar having a bifurcated bracket extending downwardly therefrom, the bifurcated bracket having a stroller wheel disposed therein, an axle extends through the bracket and the stroller wheel to facilitate securement of the wheel to the bracket; and a sled portion being comprised of an arcuate ski rotatably coupled with the bifurcated bracket of the collar in a spaced relationship with respect to the stroller wheel, the arcuate ski having a wide central section and opposed tapered forward and rearward sections, the arcuate ski having opposed upwardly extending side walls, the side walls each having a side bracket extending upwardly therefrom, each side bracket having a free upper end with an aperture therethrough, the apertures being coupled with the axle of the stroller wheel whereby the side brackets are positioned between the bifurcated bracket of the stroller frame, wherein the sled portion corresponds with the stroller wheel of the stroller.

* * * * *